United States Patent [19]

Taylor

[11] Patent Number: 5,209,253
[45] Date of Patent: May 11, 1993

[54] EMERGENCY SHUTOFF VALVE AND REGULATOR ASSEMBLY

[76] Inventor: Julian S. Taylor, 8300 SW. 8th, Oklahoma City, Okla. 73128

[21] Appl. No.: 888,086

[22] Filed: May 26, 1992

Related U.S. Application Data

[63] Continuation-in-part of Ser. No. 780,180, Oct. 21, 1991, Pat. No. 5,146,942.

[51] Int. Cl.$^5$ ............................................. F16K 17/00
[52] U.S. Cl. ..................................... 137/67; 137/461; 137/613
[58] Field of Search .......................... 137/67, 461, 613

[56] References Cited

U.S. PATENT DOCUMENTS 3,542,052 11/1970 Irwin ............................... 137/461 X
5,067,511 11/1991 Taylor ................................... 137/67
5,146,942 9/1992 Taylor ................................... 137/67

Primary Examiner—Robert G. Nilson
Attorney, Agent, or Firm—Robert K. Rhea

[57] ABSTRACT

A low gas pressure emergency shutdown valve forms part of a valve body having a flow passageway interposed in a gas supply line and forming a gas pressure regulator having a diaphragm/spring responsive poppet valve and a companion diaphragm responsive shutoff valve in the upstream end portion of the valve body maintained open by a pin bearing against the shutoff valve stem. Downstream fluid pressure, in response to a predetermined pressure limit in a flow control chamber, biases the diaphragm in a pin collapsing direction and moves the shutoff valve to a flow passageway closed position.

7 Claims, 2 Drawing Sheets 5,209,253

EMERGENCY SHUTOFF VALVE AND REGULATOR ASSEMBLY

CROSS REFERENCE TO RELATED APPLICATION

This application is a continuation-in-part of an application filed by me in the United States Patent and Trademark Office on Oct. 21, 1991, Ser. No. 07/780,180 for LOW PRESSURE FLUID EMERGENCY SHUTDOWN VALVE now U.S. Pat. No. 5,146,942.

BACKGROUND OF THE INVENTION

1. Field of the Invention

The present invention relates to gas conductors and more particularly to a gas regulator and shutoff valve interposed in a low pressure gas line between the source and a downstream distribution line.

In moving gas under relatively low pressure from a source to a point of usage it is desirable, from an economic view point, lo utilize a distribution line conductor equipped with valves capable of containing the flow and interrupting flow in the event of a malfunction of regulating equipment causing excessive downstream line pressure. Such malfunction may result in increased pressure on a low pressure unit or system. Excessive pressure or the venting of gas through a relief valve can create a dangerous situation for equipment or personnel. Relief valves on the low pressure system may prevent a vessel or line rupture or excessive pressure on a water heater but fugitive emissions may be discharged to the atmosphere.

This invention provides a combination gas regulator and an emergency shutdown valve to be interposed in a low pressure gas line, such as a commercial or residential gas line, between the source and a downstream distribution line.

2. Description of the Prior Art

I do not know of a gas regulator capable of monitoring and interrupting low pressure gas flow in the manner the valves of this invention operate.

SUMMARY OF THE INVENTION

The present invention provides an emergency shutoff valve and regulator assembly comprising a valve body having inlet and outlet ports interconnected by a flow passageway, and a valve seat formed by the valve body therein. A valve member is provided for selectively sealing against the valve seat to close the inlet port to fluid flow. The valve member is biased toward the valve seat. An axially collapsible pin supported by the valve body maintains the valve member off the valve seat so that the inlet port is normally open; upon release by the axially collapsible pin the valve member will seal with the valve seat. A regulator assembly is provided to maintain a predetermined downstream pressure through the exit flow passageway.

More particularly in the disclosed embodiment, an elongated valve body having an inlet and an outlet port at its respective ends is provided with transverse bores and counterbores at its respective end portions normal to the axis of the respective inlet and outlet port to form a coextensive pressure regulating diaphragm chamber. A chamber in the valve body communicates with both transverse bores. A diaphragm cover secured to the body closes the diaphragm chamber with a diaphragm interposed between the cover and the valve body. A downstream pressure equalizing bore provides communication between the outlet port and the diaphragm chambers.

A dual poppet valve in the downstream transverse bore is secured by its stem to the diaphragm and normally spring urged toward a closed position by a small follower spring and to an open position by a larger more powerful spring pressing on the diaphragm.

A shutoff valve having an elongated valve stem is axially disposed in the other transverse bore with its valve stem secured to and projecting through the diaphragm and the diaphragm cover. A pin nut secured to the diaphragm cover coaxial with the shutoff valve stem supports one end of a collapsible pin interposed between the nut and the shutoff valve stem for normally maintaining the shutoff valve in an open position.

The principal object of this invention is to provide a normally open emergency shutoff valve and regulator assembly which is biased to a closed position in the event of fluid pressure above a predetermined limit.

Other objects, features and advantages of the present invention will become apparent from the following detailed description when read in conjunction with the drawings and appended claims.

DESCRIPTION OF THE PREFERRED EMBODIMENTS

Figure 1:
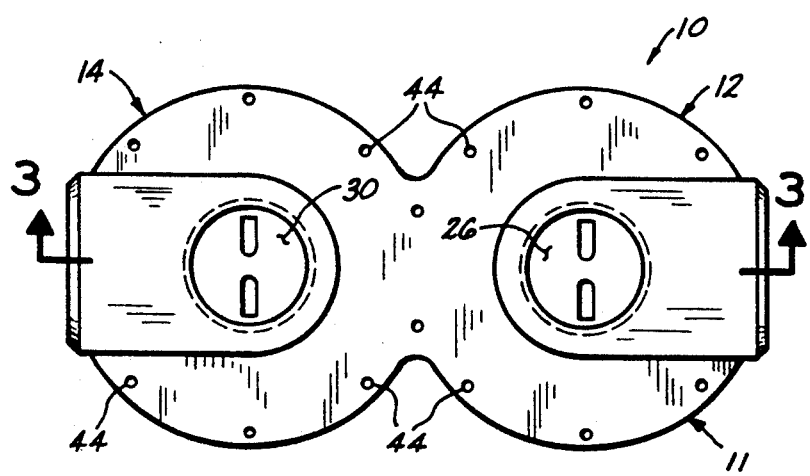
FIG. 1 is a top view of the valve.
Figure 2:
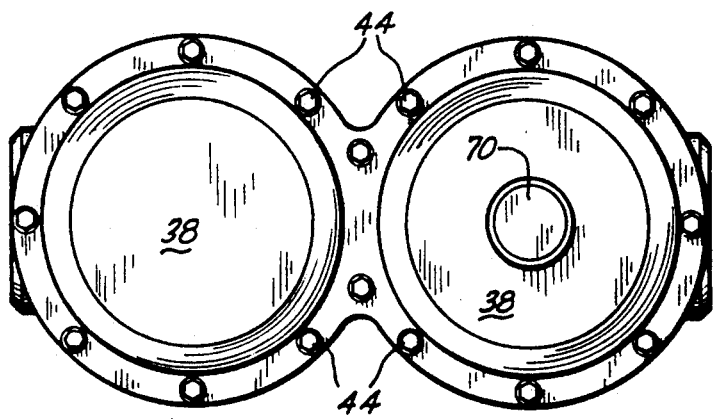
FIG. 2 is a bottom view.

Like characters of reference designate like parts in those figures of the drawings in which they occur.

In the drawings:

The reference numeral 10 indicates an emergency shutoff valve and regulator assembly having a valve body 11 which is elongated and characterized by an emergency shutoff valve means 12 and a pressure regulator assembly means 14, having inlet and outlet ports 16 and 18, respectively, defining the end portions of a flow passageway therethrough. The shutoff valve 12 and regulator assembly 14 further include transverse bores 20 and 22 normal to and intersecting the axis of their respective inlet and outlet ports 16 and 18. The upstream transverse bore 20 is counterbored from one end to form a valve seat 24 and receive a valve stem cap 26. The other end of the transverse bore 20 is counterbored to define one-half of a shutoff diaphragm chamber bore 28. The downstream transverse bore 22 is similarly counterbored at one end to receive a valve cap 30 and counterbored from its opposite end to define one-half of a companion regulator diaphragm chamber bore 32. A central body chamber B provides communication between the transverse bores 20 and 22 for the reasons presently believed apparent.

Figure 4:
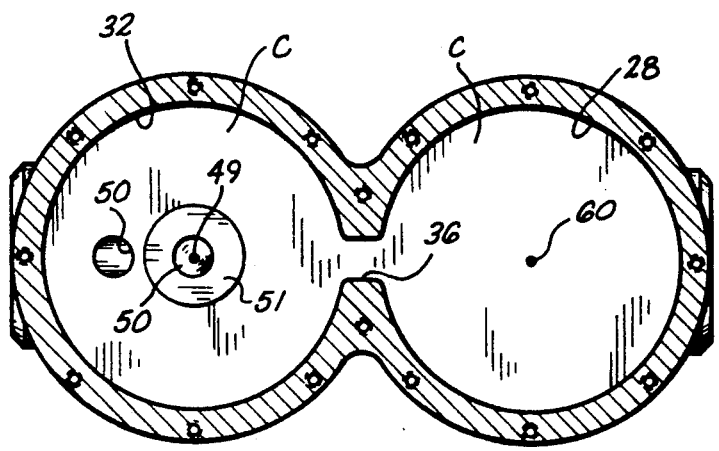
Figure 3:
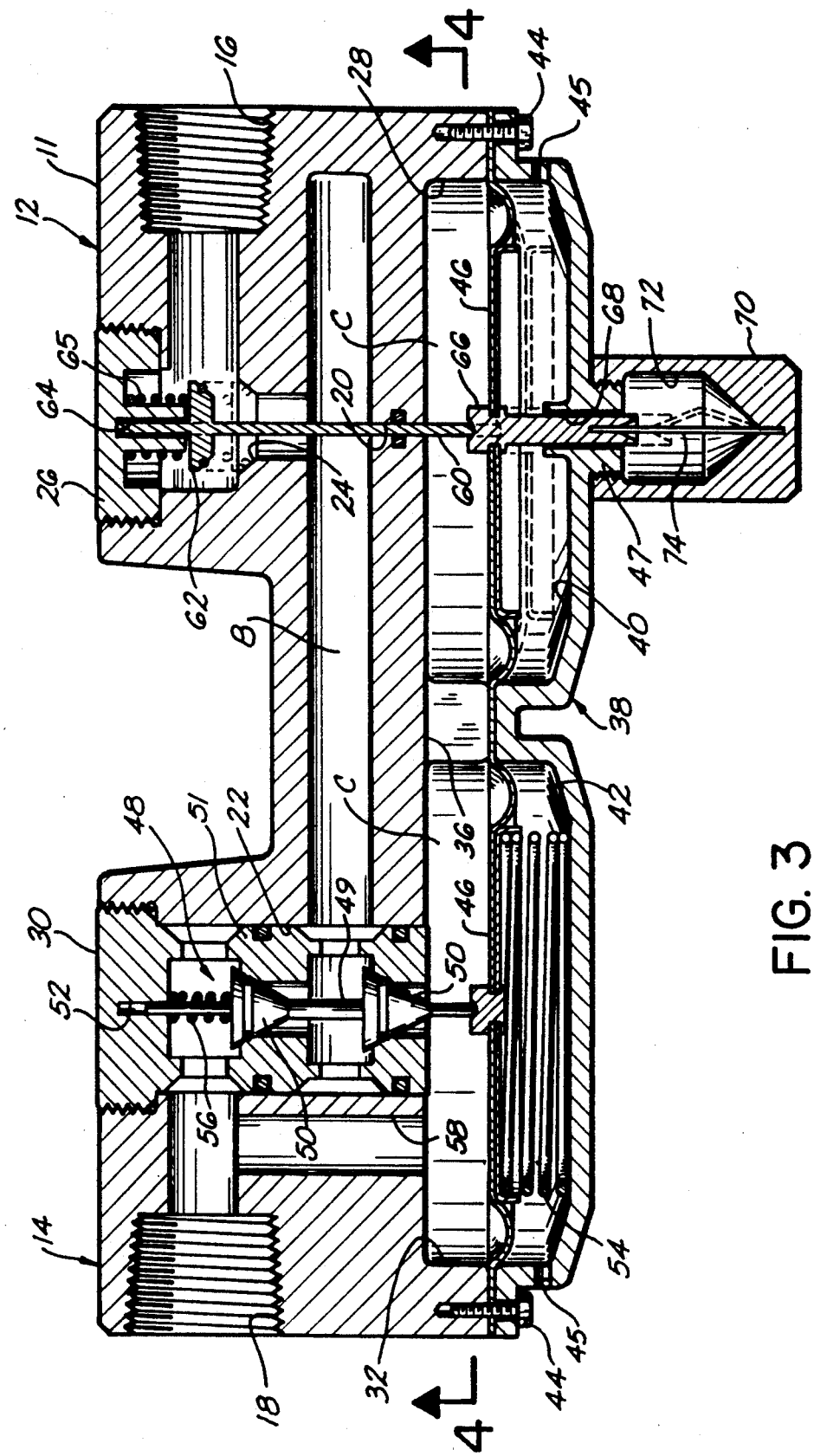
FIG. 3 is a vertical cross sectional view taken substantially along the line 3—3 of FIG. 1; and, FIG. 4 is a horizontal sectional view taken substantially along the line 4—4 of FIG. 3.

As best illustrated by FIG. 4, the wall between the chamber bores 28 and 32 is removed, as at 36 (FIGS. 3 and 4) to form a fluid outlet pressure control chamber C as presently explained. A diaphragm cover 38 having recesses 40 and 42, respectively, forming separate diaphragm half chambers opposite the respective chamber bores 28 and 32 is secured to the valve body by bolts 44. A diaphragm 46 is interposed between the diaphragm cover 38 and the valve body 11 for respectively dividing the diaphragm chambers into an ambient pressure side and an outlet port pressure side. The cover 38 is provided with vent holes 45 in its respective ends and the upstream end portion is provided with an externally threaded centrally bored boss 47 coaxial with the inlet transverse bore 20 for the purpose presently apparent.

The regulator means includes poppet valve cartridge means 48 including a poppet valve stem 49 axially supporting a pair of spaced poppet valves 50 within a valve cage 51 having cooperating valve seats is axially disposed in the transverse bore 22. The outward end portion 52 of the poppet valve stem 49 is slidably received by an axial blind bore in the poppet valve cap 30 for guiding the poppet valves 50 toward and away from their seats.

The other end of the poppet valve stem 49 is secured to the diaphragm 46 and a follower spring 54 is interposed between the diaphragm cover 38 and the diaphragm 46 opposite the poppet valve stem 49 for normally biasing the poppet valves 50 open against a poppet valve closing spring 56 bearing against the poppet valve cap 30.

A pressure equalizing bore 58 parallel with and downstream from the transverse bore 22 provides communication between the outlet port 18 and the chamber C for maintaining the poppet valves 50 balanced open in accordance with the desired fluid pressure supplied to the outlet port 18.

The upstream or inlet transverse bore 20 slidably receives an elongated stem 60 of a normally open shutoff valve head 62 having one end of the stem 60 slidably received by a blind bore 64 in the valve stem cap 26 which guides the valve 62 in its movement toward and away from its seat 24. A spring 65 biases the shutoff valve toward its seat 24. The other end portion of the valve stem 60 abuts an axially collapsible pin means normally maintaining the shutoff valve open. The pin means includes a valve stem guide and pin holder 66 secured to the diaphragm 46 and which longitudinally slidably projects outwardly through the bore 68 in the diaphragm cover 38 and boss 47. A pin holder nut 70 having a central recess 72 is threadedly secured to the boss 47. The respective end portion of a slender column or collapsible pin 74 is axially received by confronting sockets in the nut 70 and outwardly disposed end of the valve stem guide 66 and normally retains the shutoff valve 62 in open position.

Conventional elastomeric seals such as O-rings seal the valve caps 26, 30, shutoff valve stem 60 and poppet valve cage 51 fluid tight with the valve body 11 and the poppet valves 50 with their seats.

Operation

Pressurized fluid such as gas from the source to be regulated enters the inlet port 16. The valve 62 is held open by the collapsible pin 74 and the fluid passes freely to chamber B and the poppet valve cartridge 48. The position of the poppet valves 50 relative to their respective cage seat is determined by the downstream pressure in chamber C acting upon the diaphragm 46 below the dual poppet valves 50 and the counter force of the follower spring 54. If the fluid pressure is above a desired value, the spring 54 is depressed and the double poppet valves 50 close to a bubble tight seal, stopping fluid flow from chamber B to the outlet port 18. However, if the pressure in the outlet port 18 drops to a point that more fluid is needed the follower spring 54 overcomes the force on the diaphragm 46 and the dual poppet valves 50 open to admit fluid from chamber B until the desired fluid pressure is reached in chamber C (typically approximately 8 ozs. psi in a low pressure gas conduit).

If the outlet pressure in the outlet port 18 is within acceptable limits the collapsible pin 74 below the valve stem guide 66 remains straight to prevent the valve 62 in the inlet transverse bore 20 from seating on the valve seat 24. When the pressure in the outlet port 18 and chamber C rises to an unacceptable limit, as if dirt or ice is holding the poppet valves 50 off-seat, the pressure imparts an axial force on the diaphragm 46 collapsing the pin 74 and allowing the inlet valve spring 65 to seat the valve 62, thereby isolating the inlet port 16 from the regulator assembly 14 to prevent pressure build up.

In order to reset the regulator assembly 14 the poppet valve cartridge 48 is simply removed, cleaned and reinstalled. This is possible even while the valve 10 is in the line because fluid pressure is shut off by the closed valve 62.

Once the regulator assembly 14 has been serviced, the emergency shutoff valve 12 is then serviced. The pin holding nut 70 is removed, the collapsed pin 74 is replaced with a new straight pin 74 as the valve 62 is manually pushed off-seat. The emergency shutoff valve 12 and hence the valve 10 is now back in full operating condition.

Obviously the present invention is susceptible to changes or alterations without defeating its practicability. Therefore, I do not wish to be confined to the preferred embodiment shown in the drawings and described herein.

I claim:

1. An emergency shutoff valve and regulator assembly, comprising:
   a valve body having a flow passageway therethrough and communicating between an inlet port and an outlet port thereof, the valve body forming a valve seat in the flow passageway;
   valve means supported by the valve body for sealing against the valve seat and preventing fluid flow through the inlet port in a closed position, the valve means having an open position wherein the inlet port is open to fluid flow;
   axially collapsible pin means for retaining the valve means in the open position thereof when the fluid pressure is below a predetermined value and for releasing the valve means when the fluid pressure reaches the predetermined value;
   means for biasing the valve means toward the valve seat and to the closed position thereof in response to the release of the valve means by the axially collapsible pin means; and,
   regulator means for maintaining a predetermined downstream pressure through the exit outlet port.

2. The emergency shutoff valve and regulator assembly of claim 1 wherein the valve means comprises:
   a valve member having a valve head and a valve stem connected thereto, the valve head configured to selectively seat against the valve seat to seal the inlet port from communicating with the flow passageway, the valve stem slidably supported by the valve body.

3. The emergency shutoff valve and regulator assembly of claim 2 wherein the valve body forms a diaphragm chamber surrounding the end portion of the valve stem opposite the valve head, and wherein the axially collapsible pin means comprises:

a diaphragm disposed in the diaphragm chamber and dividing the diaphragm chamber into an ambient pressure side and an outlet port pressure side; and, a collapsible pin assembly comprising:

a collapsible pin; and, pin holder means supported by the valve body for retaining the collapsible pin in axial alignment with the valve stem and for transmitting axially directed force from the diaphragm to the collapsible pin whereby the valve stem is released for axial movement when the fluid pressure reaches the predetermined value; and, wherein the valve body forms a vent hole communicating with the ambient pressure side, and the valve body forms a pressure equalizing bore which communicates between the flow passageway pressure side of the diaphragm and the outlet port.

4. The emergency shutoff valve and regulator assembly of claim 3 wherein the pin holder means comprises:

a pin not removably supported by the valve body, the pin nut supporting a first end of the collapsible pin; and, a valve stem guide member connected to the diaphragm and extending between the valve stem and a second end of the collapsible pin.

5. An emergency shutoff valve and regulator assembly, comprising:

a valve body having a flow passageway therethrough and having an inlet port and an outlet port at opposing ends of the flow passageway, the valve body forming a shutoff diaphragm chamber near the inlet port and forming a valve seat in the flow passageway near the inlet port;

a diaphragm disposed within the shutoff diaphragm chamber and dividing such shutoff diaphragm chamber into an ambient pressure side and an outlet port pressure side, the valve body having a vent hole communicating with the ambient pressure side and the valve body having a pressure equalizing bore communicating between the outlet port pressure side of the shutoff diaphragm chamber and the outlet port;

shutoff valve means for closing the inlet port in response to fluid pressure at the outlet port reaching a predetermined value, the shutoff valve means comprising:

a valve member having a valve head and a valve stem, the valve stem having a first end connected to the valve head and a distal second end;

a valve stem guide in axial abutment with the second end of the valve stem; and, biasing means for biasing the valve head toward sealing engagement with the valve seat to close the inlet port;

collapsible pin means for maintaining the shutoff valve in the open position when pressure at the outlet port is below a predetermined value and for collapsing to release the shutoff valve when the pressure at the outlet port reaches the predetermined value; and, poppet valve means supported by the valve body near the outlet port for maintaining a predetermined downstream pressure through the exit outlet port.

6. The emergency shutoff valve and regulator assembly of claim 5 wherein the valve body forms a regulator diaphragm chamber near the outlet port, and the poppet valve means further comprising:

a diaphragm disposed within the regulator diaphragm chamber and dividing such regulator diaphragm chamber into an ambient pressure side and an outlet port pressure side;

a poppet valve cage disposed in the flow passageway and having a pair of axially spaced-apart valve seats;

a poppet valve stem axially disposed in said cage and secured at one end portion with said diaphragm and having axially spaced-apart dual valves; and, spring means for biasing said poppet valve open, the valve body having a vent hole communicating with the ambient pressure side of the regulator diaphragm chamber and having a pressure equalizing bore communicating between the outlet port pressure side and the outlet port.

7. An emergency shutoff valve and regulator assembly, comprising:

a valve body having opposing end portions provided respectively with an inlet and an outlet port, the valve body having inlet and outlet end portion transverse bores normal to the axes of the respective inlet and outlet ports, the valve body forming diaphragm chambers coaxial with the transverse bores near the inlet and outlet ports, respectively, the valve body having a longitudinal chamber intersecting the transverse bores between the diaphragm chambers and the inlet and outlet ports respectively, and the valve body having a pressure equalizing bore communicating with the outlet port and an outlet port pressure side of each of the diaphragm chambers, the other side of each diaphragm chamber being an ambient pressure side;

a pair of diaphragms, one diaphragm disposed in each of the diaphragm chambers to divide each diaphragm chamber between the outlet port pressure side and the ambient pressure side;

fluid pressure responsive means selectively maintaining and interrupting fluid flow through the valve body in response to a predetermined fluid pressure in the diaphragm chamber near the outlet port; and, shutoff valve means for normally opening the inlet port when fluid pressure is below a predetermined value and for closing the inlet port when the fluid pressure reaches the predetermined value, the shutoff valve means comprising:

valve means supported in the inlet end portion transverse bore adjacent the inlet port, the valve means having a valve member with a valve head and a valve stem, the valve member having a closed position in which the inlet port is closed to fluid flow and having an open position in which the inlet port is open to fluid flow, the valve means having a spring member biasing the valve member to the closed position;

axially collapsible pin means for retaining the valve member in its open position when the fluid pressure at the outlet port is below the predetermined value, and for releasing the valve member when the fluid pressure at the outlet port reaches the predetermined value, the axially collapsible pin means comprising:

a collapsible pin; and, pin holder means supported by the valve body for supporting a first end of the collapsible pin in a stationary disposition, for movably and axially supporting a second end of the pin and for transmitting axially directed force from the diaphragm near the inlet port to the collapsible pin.

* * * * *